United States Patent
Steinhauser et al.

(10) Patent No.: US 7,658,693 B2
(45) Date of Patent: Feb. 9, 2010

(54) METHOD FOR THE OPERATION OF A DRIVETRAIN

(75) Inventors: Klaus Steinhauser, Kressbronn (DE); Christian Popp, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 481 days.

(21) Appl. No.: 11/811,426

(22) Filed: Jun. 7, 2007

(65) Prior Publication Data

US 2007/0287584 A1    Dec. 13, 2007

(30) Foreign Application Priority Data

Jun. 8, 2006    (DE) ........................ 10 2006 026 601

(51) Int. Cl.
F16H 31/00    (2006.01)
B60W 10/04    (2006.01)

(52) U.S. Cl. ...................................... 477/109; 475/127
(58) Field of Classification Search ................. 477/107, 477/109; 475/120, 123, 127
See application file for complete search history.

(56) References Cited

U.S. PATENT DOCUMENTS

| | | | |
|---|---|---|---|
| 5,113,343 A | 5/1992 | Hunter et al. | |
| 6,270,444 B1* | 8/2001 | Tsutsui et al. | 477/143 |
| 6,508,742 B2 | 1/2003 | Popp et al. | |
| 6,577,939 B1 | 6/2003 | Keyse et al. | |
| 6,616,560 B2* | 9/2003 | Hayabuchi et al. | 475/116 |
| 6,623,397 B1 | 9/2003 | Raghavan et al. | |
| 6,626,786 B2* | 9/2003 | Hayabuchi et al. | 475/127 |
| 6,832,976 B2* | 12/2004 | Nishida et al. | 477/120 |
| 7,559,875 B2* | 7/2009 | Steinhauser et al. | 477/117 |
| 2002/0086760 A1* | 7/2002 | Hayabuchi et al. | 475/116 |
| 2003/0220170 A1 | 11/2003 | Nishida et al. | |
| 2005/0282680 A1 | 12/2005 | Soh | |
| 2006/0046892 A1 | 3/2006 | Bucknor et al. | |
| 2007/0129211 A1 | 6/2007 | Steinhauser et al. | |
| 2007/0287582 A1* | 12/2007 | Steinhauser et al. | 477/71 |
| 2007/0287583 A1* | 12/2007 | Steinhauser et al. | 477/71 |
| 2007/0287585 A1* | 12/2007 | Steinhauser et al. | 477/107 |
| 2007/0287586 A1* | 12/2007 | Steinhauser et al. | 477/107 |
| 2007/0287587 A1* | 12/2007 | Steinhauser et al. | 477/107 |
| 2007/0287588 A1* | 12/2007 | Steinhauser et al. | 477/109 |
| 2007/0287590 A1* | 12/2007 | Steinhauser et al. | 477/115 |
| 2007/0287591 A1* | 12/2007 | Steinhauser et al. | 477/121 |

FOREIGN PATENT DOCUMENTS

| | | |
|---|---|---|
| DE | 199 18 734 A1 | 11/2000 |
| DE | 199 28 674 A1 | 12/2000 |
| DE | 199 63 752 A1 | 7/2001 |
| DE | 100 35 479 A1 | 2/2002 |
| DE | 103 21 961 A1 | 2/2004 |

(Continued)

*Primary Examiner*—Dirk Wright
(74) *Attorney, Agent, or Firm*—Davis & Bujold, P.L.L.C.

(57) ABSTRACT

A method for the operation of a drivetrain of a motor vehicle, having an automatic transmission and a drive motor, to improve the shift speed. Successive upshifts or successive downshifts are carried out with overlap during a first upshift or downshift. At least one shift element required for a subsequent second upshift or downshift is prepared during the first upshift or downshift, in progress, when a synchronization point is reached. The subsequent second upshift or downshift are carried out immediately. Two successive upshifts or two successive downshifts are carried out by actuation of four shift elements of the automatic transmission.

12 Claims, 2 Drawing Sheets

FOREIGN PATENT DOCUMENTS

| | | |
|---|---|---|
| DE | 103 38 624 A1 | 11/2004 |
| DE | 103 30 153 A1 | 2/2005 |
| DE | 103 61 288 A1 | 7/2005 |
| DE | 10 2004 001 380 A1 | 8/2005 |
| DE | 10 2004 010 269 A1 | 9/2005 |
| DE | 10 2005 008 383 A1 | 9/2005 |
| DE | 10 2004 040 611 A1 | 3/2006 |
| DE | 10 2004 041 507 A1 | 3/2006 |
| DE | 10 2004 043 345 A1 | 3/2006 |
| EP | 1 219 868 A2 | 7/2002 |
| EP | 1 398 536 A2 | 3/2004 |
| EP | 1 533 543 A2 | 5/2005 |
| WO | WO-2004/097266 A1 | 11/2004 |
| WO | WO-2005/065981 A1 | 7/2005 |

\* cited by examiner

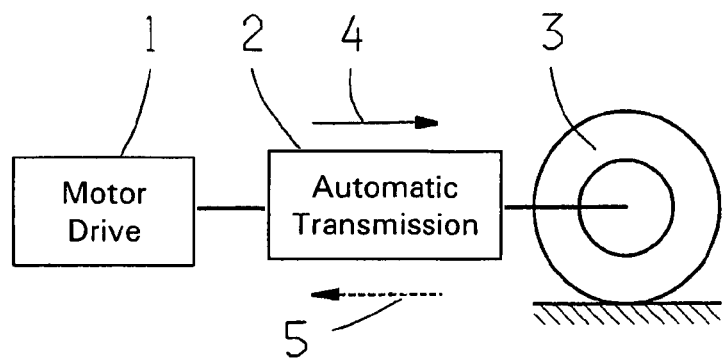
Fig. 1
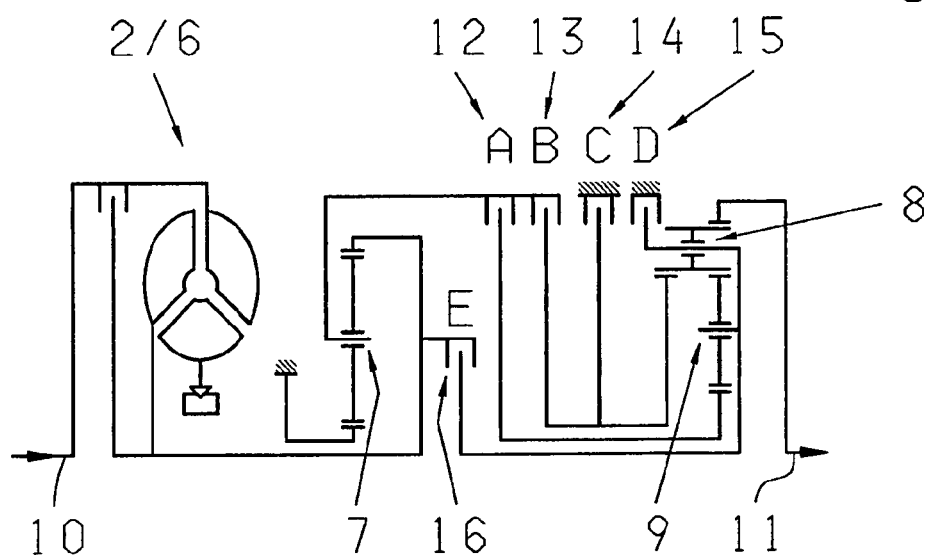
Fig. 2
| | A | B | E | C | D |
|---|---|---|---|---|---|
| 1 | • | | | | • |
| 2 | • | | | • | |
| 3 | • | • | | | |
| 4 | • | | • | | |
| 5 | | • | • | | |
| 6 | | | • | • | |
| R | | • | | | • |
Fig. 3

1
METHOD FOR THE OPERATION OF A DRIVETRAIN

This application claims priority from German Application Serial No. 10 2006 026 601.3 filed Jun. 8, 2006.

FIELD OF THE INVENTION

The invention concerns a method for the operation of a drivetrain of a motor vehicle, comprising at least an automatic transmission and a drive motor.

BACKGROUND OF THE INVENTION

The main components of a motor vehicle drivetrain are a drive motor and a transmission. A transmission converts torques and speeds and so transforms the traction force provided by the drive motor. The present invention concerns a method for the operation of a drivetrain, which comprises at least a drive motor and an automatic transmission. The automatic transmission had a total of five shift elements to transfer the torque or force in any forward gear and in a reverse gear. In each case, two shift elements are engaged and three shift elements are disengaged. In the context of the present invention, the term "automatic transmission" is understood to mean any transmission that effects automatic gear changes, known as variable-speed transmissions.

From DE 100 35 479 A1, a method for operating an automatic transmission is known, where successive upshifts and successive downshifts can be carried out with some overlap in order to improve the shift speed. For this, during each first upshift or downshift, a shift element needed for the subsequent second upshift or downshift is prepared while the first upshift or downshift is in progress in such a manner that when a synchronization point is reached, namely, a synchronous speed of the first upshift or downshift in progress, the subsequent second upshift or downshift can be carried out immediately.

In this way, according to DE 100 35 479 A1, single shifts are overlapped with one another, which means that as each first upshift or downshift carried out, a subsequent second upshift or downshift is carried out as a single shift between the two directly successive gears.

Starting from this, the present invention addresses the problem of providing a new type of method for the operation of a drivetrain comprising at least an automatic transmission and a drive motor.

SUMMARY OF THE INVENTION

According to a first embodiment of the invention, two successive upshifts or two successive downshifts can be carried out by the actuation of four shift elements of the automatic transmission in such a manner that: a) a first upshift or downshift is carried out as a multiple shift, and during the first upshift or downshift being carried out as a multiple shift, a single shift is prepared for the subsequent second upshift or downshift; b) while carrying out the first upshift or downshift as a multiple shift, a first shift element of the automatic transmission is opened and therefore disengaged and a second shift element of the automatic transmission is closed and engaged; c) while carrying out the first upshift or downshift as a multiple shift, for the subsequent second upshift or downshift that is to be carried out as a single shift, a third shift element of the automatic transmission is prepared for opening and thus disengagement and a fourth shift element of the automatic transmission is prepared for closing and engagement.

According to a second embodiment of the invention, while a first upshift or downshift is being carried out, a shift element for a subsequent second upshift or downshift, that is to be engaged during the second upshift or downshift is prepared for engaging at a time which comes before the synchronization point of the first upshift or downshift, in progress, has been reached by a time interval that can be applied in a time-controlled or event-controlled manner.

According to a third embodiment of the invention, while a first upshift or downshift and/or while a second subsequent upshift or downshift is being carried out, torque of the drive motor is increased and/or decreased compared with drive motor torque, deduced from a driver's wish in order to support the overlapped implementation of successive upshifts or downshifts.

The above three embodiments, according to the invention, can be used either alone or in a combination of two embodiments or in a combination of all three embodiments for the operation of a drivetrain.

BRIEF DESCRIPTION OF THE DRAWINGS

The invention will now be described, by way of example, with reference to the accompanying drawings in which:

FIG. 1 is a drivetrain layout of a motor vehicle;

FIG. 2 is a transmission layout of an automatic transmission of the drivetrain with five shift elements;

FIG. 3 is a shift element matrix for the shift elements of the transmission layout in FIG. 2, to indicate which shift elements are engaged in which gear.

DETAILED DESCRIPTION OF THE INVENTION

Figure 4:
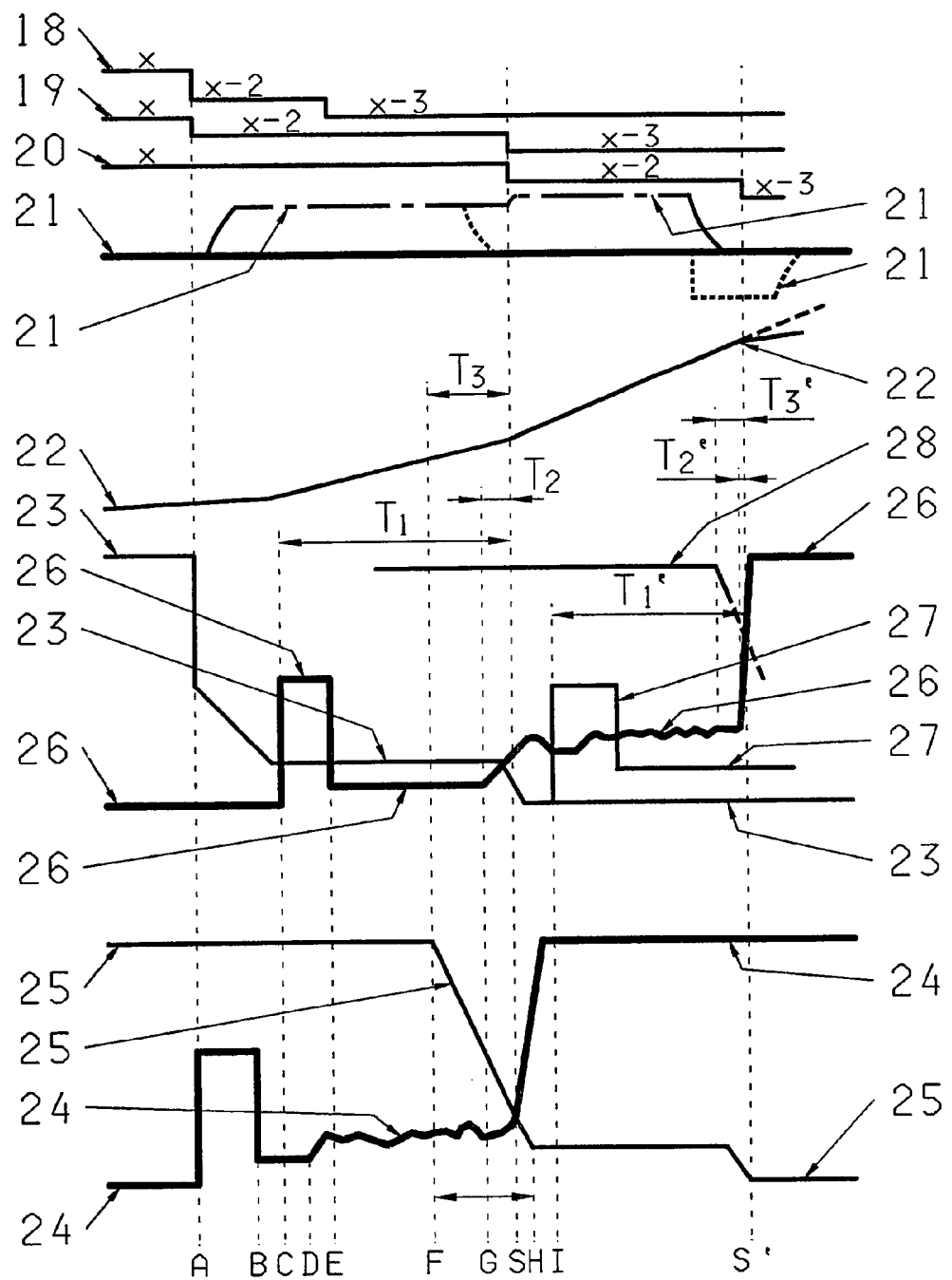
FIG. 4 is a diagram, according to the invention, to clarify the method of operating a drivetrain of a motor vehicle, which comprises an automatic transmission according to FIGS. 2 and 3.

FIG. 1 shows a schematic representation of a drivetrain of a motor vehicle, the drivetrain comprising a drive motor 1, an automatic transmission 2 and a drive wheel 3 of the motor vehicle. The automatic transmission 2 transfers the traction force produced by the drive motor 1 to the wheels 3 of the motor vehicle.

According to FIG. 1, when the drivetrain is operated in traction mode, a flow of power is directed in the direction of arrow 4 from the drive motor 1 toward the wheels 3 of the motor vehicle. In contrast, if the drivetrain is operated in thrust mode, for example, when braking or coasting, then the flow of power is in the direction of arrow 5, from the wheels 3 toward the drive motor 1.

The invention concerns a method for the operation of a drivetrain which comprises at least a drive motor 1 and an automatic transmission 2, as shown in FIGS. 2 and 3. FIG. 2 shows a transmission layout 6 of the variable speed automatic transmission 2, which comprises several transmission gearsets 7, 8 and 9 for the conversion of a transmission input torque, applied at a transmission input 10, into a transmission output torque at a transmission output 11. The transmission gearsets 7, 8 and 9 of the automatic transmission 2 are made as planetary transmission gearsets according to FIG. 1.

According to the transmission layout 6 of FIG. 2, besides the transmission gearsets 7 through 9, the automatic transmission 2 also has a total of five shift elements 12, 13, 14, 15 and 16; the shift element 12 is denoted shift element A; shift element 13 as shift element B; shift element 14 as shift element C; shift element 15 as shift element D, and shift element 16 as shift element E. Shift elements C and D are a brake in each case, while each of shift elements A, B and E is a clutch.

For the automatic transmission, represented as a schematic in FIG. 2, comprising the five shift elements 12 through 16, application of a shift matrix 17, shown in FIG. 3, enables six forward and one reverse gear to be engaged, the six forward gears "1" through "6" and the reverse gear "R" being entered in the left-hand column of the shift matrix 17 and the shift elements A through E along the top line of the matrix 17.

Shift elements marked with a spot in the shift element matrix 17 are engaged when the corresponding gear is engaged. According to the matrix, in each forward gear and in the reverse gear, respectively, two of the five shift elements are engaged in each case. Thus for example, the shift elements A and D for forward gear "1", while shift elements B and D for the reverse gear "R" are engaged. On the other hand, the other shift elements are disengaged in the respective gears.

Accordingly, to transmit force or torque from the transmission input 10 to the transmission output 11, in the automatic transmission 2 shown in FIGS. 2 and 3, two shift elements are completely engaged and, in contrast, three shift elements are completely disengaged for each forward gear and for the reverse gear.

To improve the shift speed, successive upshifts or successive downshifts are carried out with some overlap, namely in such a manner that during a first upshift or downshift more than one, namely, two shift elements needed for the subsequent second upshift or downshift are prepared, while the first upshift or downshift is in progress, and this in such a manner that as soon as a synchronization point of the first upshift or downshift in progress is reached, the next second upshift or downshift can be carried out immediately.

In this, as the first upshift or downshift, a multiple shift is carried out during which a single shift is prepared for as the subsequent second upshift or downshift.

In the left-hand column of the Table below is shown examples of the downshifts that can be carried out with overlap by the automatic transmission 2, shown in FIGS. 2, 3, such that when in the left-hand column, is a downshift is entered in parentheses after another downshift, the downshift not in parentheses is the first downshift and thus a multiple shift and the downshift in parentheses is the second downshift and thus a single shift, for which shift elements, namely two shift elements, are prepared while the first downshift to be carried out as a multiple shift, is in progress.

| | SHIFT ELEMENTS | | | | |
|---|---|---|---|---|---|
| Shift | A | B | C | D | E |
| 6-4 (4-3) | e | pe | d | — | pd |
| 5-3 (3-2) | e | pd | pe | — | d |

In the above Table, shift elements, which are closed and thus engaged during a first downshift to be carried out are denoted "e". Shift elements which, in contrast, are open and thus disengaged during a first downshift are denoted "d" in the above Table. Shift elements which, during a first downshift, are prepared for closing and thus engagement or for opening and thus disengagement with a view to a subsequent second downshift are respectively denoted "pe" or "pd" in the Table. Shift element marked "–" are and remain disengaged during a downshift.

From the above Table, it can be seen that in an automatic transmission with five shift elements in which two respective shift elements are engaged and three shift elements are disengaged in any forward gear and in the reverse gear, for the overlapped implementation of two successive downshifts, four shift elements are actuated in order, first, to carry out the first downshift as a multiple shift, in particular a double shift and, second, to prepare for the second downshift, a single shift, while the first downshift is in progress. The same applies analogously for upshifts to be carried out with overlap.

According to a first aspect of the present invention, when a first upshift or downshift is carried out as a multiple shift, a first shift element is opened and thus disengaged and a second shift element is closed and thus engaged. While this first upshift or downshift is being carried out as a multiple shift, for the subsequent second upshift or downshift to be prepared for and, if necessary, carried out, a third shift element is prepared for opening and thus disengagement and a fourth shift element is prepared for closing and thus engagement.

This first embodiment of the present invention will be described below with reference to FIG. 4, considering the example of two successive downshifts. The first downshift is carried out as a multiple shift, namely a double shift. The second downshift is prepared for as a single shift while the first downshift is being carried out.

FIG. 4 shows the time variations of various signals; a signal variation 18 represents a driver's-wish-dependent desired gear; a signal variation 19 represents a target gear determined on the basis of the desired gear; a signal variation 20 represents a gear currently engaged; a signal variation 21 represents a torque of the drive motor 1 of the drivetrain, and a signal variation 22 represents a speed of the drive motor 1.

Signal variations 23, 24, 25 and 26 represent the actuation or behavior, in time, of the four shift elements involved in the overlapping implementation of two successive downshifts; signal variation representing the time behavior of a first shift element to be opened and thus disengaged during the first downshift; signal variation 24 representing the time behavior of the second shift element to be opened and thus disengaged during the first downshift; signal variation 25 representing the time behavior of the third shift element to be prepared for opening and thus disengagement during the first downshift for the subsequent second downshift, and signal variation 26 representing the time behavior of the fourth shift element to be prepared for closing and thus engagement during the implementation of the first downshift for the subsequent second downshift.

At time A, there is a change of the desired gear (see signal variation 18) and, derived from this, a change of the target gear (see signal variation 19) by way of a desired multiple downshift through two gears (x−2), this then triggering the overlapped implementation or preparation of successive downshifts, namely in such a manner that at time A, on one hand, the first shift element that is to be opened and thus disengaged (see signal variation 23) begins its shift phase and, on the other hand, the second shift element that is to be closed and thus engaged (see signal variation 24) while the first downshift is in progress, undergoes rapid filling which takes place between times A and B.

The third shift element (see signal variation 25) and the fourth shift element (see signal variation 26) that, while the first downshift, which is a multiple downshift, is being carried out, are to be prepared for the subsequent second downshift, which is a single shift, are set to a defined condition at time A.

On completion of the rapid filling of the second shift element that is to be closed and, therefore, engaged in the first downshift (see signal variation 24), the second shift element changes from the rapid filling phase to a filling equalization phase. This filling equalization phase extends between times B and D. The rapid filling phase, between times A and B, and the filling equalization phase, between times B and D, together define the entire filling phase of the second shift element that is to be engaged during the first downshift. At time D, the second shift element to be closed and, therefore, engaged during the first downshift (see signal variation 24) changes from the filling phase to the shift phase.

While the first downshift is being carried out as a multiple shift during which the first shift element, in accordance with signal variation 23, is opened and thus disengaged and the second shift element, in accordance with signal variation 24, is closed and thus engaged, shift elements are prepared for a possible subsequent second downshift to be carried out as a single shift. Thus at time C, the preparation of the fourth shift element (see signal variation 26) that will be closed and thus engaged in a possible subsequent second downshift takes place by rapid filling, which lasts between times C and E. On completion of the rapid filling of the fourth shift element at time E, this changes to a filling equalization phase which, as shown in FIG. 4, lasts until time G. At time G, the fourth shift element prepared for engagement changes from the filling phase to the shift phase.

Likewise, while the first downshift is in progress, the third shift element is prepared for opening or disengagement with a view to a subsequent second downshift (see signal variation 25). At time F, a transition phase of the third shift element prepared for disengagement with a view to the subsequent second downshift is started, and at time S, which corresponds to a synchronization point of the first downshift, a change from the first downshift to the subsequent second downshift takes place.

When time S is reached, the shift elements prepared during the first downshift become the active shift elements of the subsequent second downshift. Thus from time G, the fourth shift element prepared during the first downshift for closing and thus engagement is the shift element to be engaged for the second downshift. The first shift element to be opened and thus disengaged in the first downshift is disengaged. From time H, the third shift element, which was prepared for opening or disengagement, reaches its disengagement pressure level.

During the subsequent second downshift, shift elements are prepared for a possible subsequent third downshift, which would be again a single downshift (see signal variations 27 and 28).

According to a second embodiment of the present invention, during the implementation of the first downshift, for the subsequent second downshift the third shift element that is to be engaged during the second downshift (see signal variation 26) is prepared for engagement by rapid filling at a time C, which occurs before the sychronization point of the first downshift in progress has been reached at time S by a first time interval $T^1$ applicable in a time-controlled or event-controlled way. The first time interval $T^1$ applicable by time or event control, for example, can be determined by way of a time reserve or a speed difference relative to the synchronization point S of the first downshift.

If time C which, as shown in FIG. 4, is determined from the synchronization point S and the applicable time interval $T^1$, occurs later than the end of the rapid filling phase of the second shift element to be engaged during the first downshift (see signal variation 24), i.e., later than time B, then the preparation of the fourth shift element, which is to be engaged during the second downshift (see signal variation 26), is started immediately. On the other hand, if time C, determined from the synchronization point of the first downshift in progress and from the applicable first time interval $T^1$, occurs earlier than the end (time B) of the rapid filling phase of the second shift element to be engaged during the first downshift, the preparation of the fourth shift element is delayed until the rapid filling phase of the second shift element to be engaged during the first downshift has been completed.

As already mentioned, the fourth shift element, which is prepared for engagement for the second downshift while the first downshift is taking place (see signal variation 26), is changed over at time G from the preparation phase to the shift phase, this time G occurring before the synchronization point S of the first downshift has been reached by a second time interval $T^2$, which can be determined as a function of time or events.

Thus, as shown in FIG. 4, if this time G, determined from the synchronization point S of the first downshift and the applicable second time interval $T^2$, occurs later than the end of the rapid filling phase (time E) of the fourth shift element that is to be engaged during the second downshift, the fourth shift element to be engaged during the second downshift is changed directly from the preparation phase to the shift phase. On the other hand, if the time G, determined from the synchronization point S of the first downshift in progress and the applicable second time interval $T^2$, occurs earlier than the end of the rapid filling phase (time E) of the fourth shift element due to be engaged during the second downshift, then the change of the fourth shift element from its preparation phase to its shift phase is delayed until the rapid filling phase of the fourth shift element has been completed.

As already explained above, the third shift element prepared during the implementation of the first downshift for opening and thus disengagement with a view to the subsequent, second downshift is changed at time F from its preparation phase to its shift phase, this time F occurring before the synchronization point S of the first downshift has been reached by a third time interval $T^3$ applicable in a time-controlled or event-controlled way.

In the example embodiment shown, at time F it is decided whether the second downshift, prepared for during the first downshift, will actually be carried out.

A prepared next downshift is only actually carried out if the driver so wishes. From FIG. 4, it can be seen that at time F, in accordance with the signal variation 18 which represents the driver's wishes, a further downshift (x−3) is called for in order to reach the desired gear. In the example of FIG. 4, the second downshift is then also actually carried out.

As already explained above, during the second downshift corresponding shift elements are prepared in accordance with signal variations 27 and 28 for a third subsequent downshift, such that in FIG. 4, for the third downshift to be prepared for during the second downshift, the corresponding applicable first time interval $T'^1$, second time interval $T'^2$ and third time interval $T'^3$ relate to a synchronization point S' of the second downshift. The third downshift, prepared for while the second downshift is being carried out, is a single downshift.

From FIG. 4, it can be seen that at a time defined by the synchronization point S' of the second downshift and the applicable third time interval $T'^3$, on the basis of the signal variation 18 that represents the driver's wishes, no further downshift is required in order to reach the desired gear so the third downshift prepared for, while the second downshift is taking place, is not carried out, but instead discontinued.

As can be seen from FIG. 4, in accordance with the signal variation 20, the current gear is set to a new value by recognition of the synchronization points S or S' of a shift carried out while, in accordance with the signal variation 19, the target gear changes to the next gear or remains unchanged, depending on the desired gear, according to the signal variation 18.

According to a third aspect of the present invention, in the example embodiment shown in FIG. 4, during the implementation of the first downshift and during that of the second downshift, a torque of the drive motor is increased and/or reduced in comparison tp a torque derived from the driver's wish, in order to support the overlapped implementation of the successive downshifts. Thus, the signal variation 21, represented in FIG. 4 as a solid line corresponds to a drive motor torque derived from a driver's wish. According to a first variation indicated in FIG. 4 as a dot-dash line, during the implementation of both the first and the second downshift the drive motor torque is increased, relative to the drive motor torque derived from the driver's wish. In contrast, according to a second variation indicated in FIG. 4 as a dotted line, at the end of the second downshift, the drive motor torque is reduced in relation to the drive motor torque derived from the driver's wish. Below, both variations will be explained in more detail.

The amount of the drive motor torque, indicated in FIG. 4 as a dot-dash line, relative to the drive motor torque derived from the driver's wish, takes place when the drivetrain is operated either in thrust mode or in part-load traction mode. During every downshift carried out in thrust or part-load traction operation, the drive motor torque is increased relative to the torque derived from the driver's wish and, during each downshift carried out, it is checked whether a prepared subsequent downshift corresponds to the driver's wish. This is done at a time that depends, on one hand, on the synchronization point S and, on the other hand, on the applicable third time interval $T^3$, i.e., in the example embodiment of FIG. 4 at time F.

At this time, on the basis of the driver's wish, when a subsequent downshift is required, the amount of torque during the first downshift is changed to the amount of torque during the second downshift. It can be seen, in the example embodiment illustrated, that the amount of torque during the second downshift is larger than that during the first downshift. In contrast, it can also be that the amount of torque of the second downshift is smaller than that of the first downshift. Likewise, the two amounts of torque can be of equal size. There is a ramp-like transition preferably, between the two amounts of torque there is a ramp-like transition.

In contrast, at the above time defined by the synchronization point S and the applicable third time interval $T^3$, on the basis of the driver's wish, if no subsequent downshift is required, the prepared follow-up downshift is discontinued and the increase of the amount of drive motor torque is ended in order to complete the shift. This is shown in FIG. 4 for the third downshift prepared during the second downshift.

During the implementation and preparation of successive downshifts, when the drivetrain is operating in traction mode, during each downshift carried out, at a time applicable by virtue of time- or event-control, namely at the time that depends on the synchronization point S and the applicable third time interval $T^3$, it is again checked whether a prepared next shift corresponds to a driver's wish. As shown in FIG. 4, for the third downshift prepared for during the second downshift, if this is not the case then the prepared follow-up downshift is discontinued and, in order to complete the shift in traction operation, the drive motor torque reduction is carried out, represented in the signal variation 21 of FIG. 4 as a dotted line, relative to the torque derived from the driver's wish.

In contrast, when at the time a subsequent downshift is desired, as is the case in FIG. 4 for the second downshift prepared for during the first downshift, the drive motor torque reduction is not carried out. Accordingly, torque reduction during downshifts only takes place when a shift process is to be ended, i.e., when no subsequent shift is required.

Furthermore, the above torque reduction only takes place during traction operation and then both under full load and under part load. On the other hand, during thrust operation, this torque reduction does not take place during downshifts.

In the example embodiment of FIG. 4, two successive downshifts can be carried out as overlapping shifts by the actuation of four shift elements such that, as shown in FIG. 4, to carry out the first downshift as a multiple shift, a first shift element (see signal variation 23) is opened and thus disengaged and a second shift element (see signal variation 24) is closed and thus engaged. While the first downshift is implemented as a multiple shift, with a view to the subsequent second downshift to be carried out as a single shift, the third shift element (see signal variation 25) is prepared for opening and thus disengagement and the fourth shift element (see signal variation 26) is prepared for closing and thus engagement.

According to the invention illustrated as an example in FIG. 4, the procedure for overlapped downshifts can be used analogously for overlapped upshifts. Compared with the implementation of successive downshifts as in FIG. 4, for the implementation of successive upshifts, the only difference relates to the third embodiment of the present invention, which concerns the increase or decrease of the torque of the drive motor relative to a drive motor torque derived from the driver's wish.

Thus, when the drivetrain is in thrust operation during successive upshifts the torque is increased for both of the upshifts while, in contrast during traction operation, the torque is reduced for both upshifts. The torque reduction to end the shift process does not take place in the case of successive upshifts.

REFERENCE NUMERALS

1 drive motor
2 automatic transmission
3 wheel
4 arrow
5 arrow
6 transmission layout
7 transmission gearset
8 transmission gearset
9 transmission gearset
10 transmission input
11 transmission output
12 shift element A
13 shift element B
14 shift element C
15 shift element D
16 shift element E
17 shift element matrix
18 signal variation
19 signal variation
20 signal variation
21 signal variation
22 signal variation
23 signal variation
24 signal variation
25 signal variation
26 signal variation
28 signal variation

The invention claimed is:

1. A method of operating of a drivetrain of a motor vehicle having at least a drive motor and an automatic transmission with at least five shift elements, the method improving a shift speed of at least one of a successive upshift and a successive downshift such that, during a first upshift or a first downshift, at least one shift element, required for the respective successive upshift or the successive downshift, is prepared such that when a synchronous speed of the first upshift or the first downshift, in progress, is reached, the successive upshift or the successive downshift can be immediately carried out, the method comprising the steps of:

enabling actuation of four shift elements to carry out two respective consecutive upshifts or two respective consecutive downshifts with at least some overlap;

executing the first upshift and the first downshift as a multiple gear shift;

preparing the successive upshift or the successive downshift, during execution of the first upshift or the first downshift, with the successive upshift or the successive downshift being a single gearshift;

disengaging a first shift element and engaging a second shift element during execution of the first upshift or the first downshift;

preparing a third shift element for disengagement, during execution of the first upshift or the first downshift, in the successive upshift or the successive downshift; and preparing a fourth shift element for engagement, during execution of the first upshift or the first downshift, in the successive upshift or the successive downshift.

2. The method according to claim 1, further comprising the step of preparing the at least one shift element for a subsequent upshift or a subsequent downshift, during a previous upshift or a previous downshift, and only preforming the subsequent upshift or the subsequent downshift if the subsequent upshift or the subsequent downshift corresponds to an input provided by a driver at one of a time-controlled applicable time and an event-controlled applicable time.

3. The method according to claim 1, further comprising the steps of providing the automatic transmission of the drive motor with five shift elements, and transferring, in each of a plurality of gears, one of torque and force by engaging two shift elements and disengaging three shift elements.

4. A method of operating of a drivetrain of a motor vehicle having at least a drive motor and an automatic transmission, the method improving a shift speed of a successive upshift or a successive downshift, such that during a first upshift or a first downshift at least one shift element, required for the respective successive upshift or the successive downshift, is prepared such that when a synchronization point of the first upshift or the first downshift, in progress, is reached, the successive upshift or the successive downshift can be immediately carried out, the method comprising the steps of:

enabling two respective consecutive upshifts or two respective consecutive downshifts to be carried out with at least some overlap; and preparing for engagement, during the first upshift or the first downshift, the at least one shift element required for the successive upshift or the successive downshift at a time which precedes the synchronization point of the first upshift or the first downshift by one of a time-controlled and an event-controlled applicable first time period.

5. The method according to claim 4, further comprising the step of delaying the preparation of the at least one shift element to be engaged, during the successive upshift or the successive downshift, until a rapid filling phase of a first shift element, to be engaged during the first upshift or the first downshift, is completed, if the time, determined from the synchronization point of the first upshift or the first downshift in progress and the first time period, occurs before the end of the rapid filling phase of the first shift element, otherwise immediately beginning preparation of the at least one shift element to be engaged during the successive upshift or the successive downshift.

6. The method according to claim 4, further comprising the step of changing the at least one shift element, prepared to be engaged during the successive upshift or the successive downshift, from a preparation phase to a shift phase at a time before reaching the synchronization point of the first upshift or the first downshift, by a second time interval applied in another time-controlled manner or another event-controlled manner.

7. The method according to claim 6, further comprising the step of delaying the step of changing the at least one shift element, prepared to be engaged during the successive upshift or the successive downshift, from the preparation phase to the shift phase, until the rapid filling phase of the at least one shift element to be engaged during the successive upshift or the successive downshift is completed, if the time before reaching the synchronization point of the first upshift or the first downshift and the second time interval occurs before the end of a rapid filling phase of the at least one shift element to be engaged during the successive upshift or the successive downshift, otherwise immediately changing the at least one shift element to be engaged during the successive upshift or the successive downshift from the preparation phase to the shift phase.

8. The method according to claim 4, further comprising the steps of preparing, at the beginning of the first upshift or the first downshift, the at least one shift element for disengagement during the successive upshift or the successive downshift, and switching the at least one shift element, prepared for disengaging in the successive upshift or the successive downshift, from a preparation phase to a shifting phase at the time that precedes the synchronous point of the first upshift or the first downshift, by a time-controlled or event-controlled applicable third time period.

9. A method of operating of a drivetrain of a motor vehicle having at least a drive motor and an automatic transmission, the method improving a shift speed of at least one of a successive upshift and a successive downshift, such that during a first upshift or a first downshift at least one shift element, required for the respective successive upshift or the successive downshift, is prepared such that when a synchronization point of the first upshift or the first downshift, in progress, is reached, the successive upshift or the successive downshift can be immediately carried out, the method comprising the step of:

one of increasing and decreasing a torque of the drive motor, relative to a torque of the drive motor derived from a driver's wish, during at least one of the first upshift or the first downshift and the successive upshift or the successive downshift to assist in overlapped implementation of the successive upshifts or the successive downshifts.

10. The method according to claim 9, further comprising the step of checking, during each downshift carried out and at a time, applicable in a time-controlled manner or an event-controlled manner, whether a prepared successive downshift, corresponds with a driver's wish to carry out at least a further successive downshift during traction operation of the drivetrain, if no further successive downshift is desired, discontinuing preparation for the successive downshift and reducing the torque of the drive motor torque relative to the torque of the drive motor derived from the driver's wish, but if the further successive downshift is desired, on a basis of the driver's wish, carrying out the prepared successive downshift without reducing the torque of the drive motor.

11. The method according to claim 9, further comprising the step of increasing the torque of the drive motor, relative to torque of the drive motor derived from the driver's wish, during each downshift carried out and also checking, during each downshift carried out and at the time applicable in a time-controlled manner or an event-controlled manner, whether a prepared successive downshift corresponds to the driver's wish to carry out a further successive downshift, when the drivetrain is in a thrust operation or a part-load traction operation, if the further successive downshift is desired, a ramp-like transition is implemented between torque levels of the further successive downshifts, but if the further successive downshift is not desired, discontinuing the prepared successive downshift and the torque of the drive motor is discontinued to prevent the further successive downshift.

12. The method according to claim 9, further comprising the steps of reducing the torque of the drive motor, relative to the torque derived from the driver's wish during traction operation of the drivetrain to carry out the successive upshifts; and increasing the torque of the drive motor relative to the torque derived from the driver's wish, during each of the successive upshifts carried out, to carry out the successive upshifts during thrust operation of the drivetrain.

* * * * *